Patented Jan. 17, 1928.

UNITED STATES PATENT OFFICE.

LOUIS LEFRANC, OF PARIS, FRANCE.

PROCESS FOR THE MANUFACTURE OF KETONES.

No Drawing. Application filed May 16, 1924, Serial No. 713,850, and in France May 17, 1923.

This invention relates to the process for manufacturing ketones, and has for its object to provide an improved process for the economical manufacture of all kinds of ketones, which process is carried out by the distillation of the calcium or other salts that are obtained from their corresponding acids.

In order that the features of novelty of this process may be more readily understood, the following description is given of the method usually employed in the manufacture of dipropylketone and its accompanying derivatives on an industrial basis.

The wines or worts resulting from the butyric fermentation of sugars, glucosides, polysaccharides, amylaceous substances, amino-acids, etc.; in the presence of calcium carbonate, are concentrated in an ordinary evaporator up to the saturation point, it being then possible to separate them from the mother-liquors by successive operations of centrifugal separation, skimming or filtration. The calcium salts that are collected are placed into a drying apparatus the temperature of which may be between 100° and 150° C. or may even reach 200° C.

After being dried, the mass has become very friable and can easily be distintegrated into powder. This powder is composed chiefly of calcium butyrate, a small percentage of calcium propionate and a still smaller percentage of calcium acetate.

As is the case with the majority of the calcium salts of the fatty series, the calcium butyrates can be easily decomposed by heat into calcium carbonate and ketone according to the following equation:

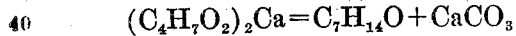

$$(C_4H_7O_2)_2Ca = C_7H_{14}O + CaCO_3$$

This calcium butyrate has a melting temperature of 360° C. and when raised to this temperature becomes a pasty, porous and spongy mass which can only be compared to an emulsion; at the same time, if the opperation is carried out in a hermetically closed vessel, the dipropylketone is given off and passes into a cooler where it is condensed.

However, while on the one hand, on account of the porous and spongy nature of the mass it retains within its pores a considerable portion of the gaseous dipropylketone, on the other hand, the mass is so adhesive and tenacious that it is not possible to render it homogeneous even by submitting it to a vigorous mixing. Moreover it is a bad conductor of heat.

Under these conditions, the only method of extracting this dipropylketone is by increasing the temperature, but this leads to an important proportion of the substance being destroyed by pyrogenation. It follows from what has been stated that the output of ketone that it is possible to obtain by this process is very small and that the ketone thus obtained is very impure.

The improved process in accordance with this invention entirely obviates the disadvantages referred to above while making it possible to obtain a yield in ketone almost equal to the theoretical yield indicated in the above equation. This improved process consists in modifying the physical state of the mass, whatever its temperature may be, by adding thereto an inert substance adapted to thoroughly divide it by creating pores or channels throughout, whereby the ketone vapors more easily evolve without necessitating any such increase of temperature as would lead to any pyrogenation of "cracking" of the ketones.

This incorporation of an inert substance such as sand or desiccated clay is carried out in the following manner:—

Calcium butyrate, to which has previously been added 30 to 50% or more of sand or desiccated clay, is first introduced into a hermetically closed vessel such as a retort provided with an inlet and an outlet and a pipe for the discharge of gases and vapors connected with a condenser and provided internally with a high-speed mixer. This retort is placed in a heater adapted to cause its temperature to rise to approximately 400 to 450° C.

The mixer having been previously set in motion, the retort is progressively heated; through its discharge pipe then first passes a small quantity of steam and afterwards, when the temperature has reached 300 to 350° C., the decomposition of the calcium butyrate commences and is carried on with an increasing speed; by maintaining the temperature between 390 and 400° C. the dipropylketone thus obtained can be condensed in a pipe coil.

The uniform mixing carried out at a well regulated temperature is so short in duration that it is possible to render it continuous by using a special device therefor.

The solid mass which afterwards is removed from the retort is composed of a mixture of sand or clay and pure calcium carbonate. This mass is white if the sand used was white or it will be of the same color as the color of the inert substance that was added to the calcium butyrate.

The raw dipropylketone thus obtained is slightly amber-colored. If desired, it may be purified in a still to render it colorless, or it may be concentrated. It is a highly unstable liquid having the odor of apples with a specific gravity of about .805 and a mean boiling point between 88° and 100° C. This liquid is insoluble in water and possesses all the properties of ketones of the aliphatic series. It possesses a thermal power of 9269 calories and a vapor tension which permits of its use as a fuel for internal combustion engines.

As the solid residue that has been removed from the retort is formed of a mixture of sand and calcium carbonate furnished by the calcium butyrate, it can be used as a raw material in the manufacture of bricks or other silico-calcarious materials employed in the building industry. In cases where it is formed of clay and calcium carbonate, it can be used in the manufacture of cements.

Owing to these solid residues being thus utilizable as raw materials of relatively high value, the improved process in accordance with this invention can be carried out with considerable economy.

I claim:—

1. An improved process for the manufacture of ketones which consists in adding to the desiccated calcium salt derived from the corresponding acid of the fatty series obtained from the corresponding acid fermentation of sugars, in the presence of calcium carbonate, an inert sand that has been previously desiccated, in heating the mixture to a temperature of 300 to 400° C. and subjecting the same to a continuous mixing while so heated, whereby the calcium salts are decomposed and the corresponding ketone is given off as a vapor.

2. An improved process for the manufacture of dipropylketone which consists in adding to desiccated calcium butyrate obtained from worts resulting from the butyric fermentation of sugars in the presence of calcium carbonate an inert substance comprising sand that has been previously desiccated, in heating the mixture so formed to a temperature of 300° to 400° C. and subjecting the same to a continuous mixing while being so heated, whereby the calcium salts are decomposed and dipropylketone given off as a vapor, and in subsequently condensing the vapor.

3. The process of manufacturing ketones which comprises submitting to a dry distillation at a temperature of approximately 300 to 400° C., a mixture of aliphatic calcium salts and a dry inert granular substance whilst continuously stirring said mixture, and condensing the ketone vapors that evolve.

4. The process of manufacturing ketones which comprises submitting to a dry distillation at temperatures ranging between 300 and 400° C., a mixture of substantially 100 parts by weight of desiccated aliphatic calcium salts and 30 to 50 parts by weight of a dry inert granulous substance, whilst continuously stirring said mixture, and condensing the ketone vapors that evolve.

5. The process of manufacturing ketones which comprises submitting to a dry distillation at a temperature slowly increasing up to 300 to 400° C., a mixture of one or more aliphatic calcium salts and a granulous inert substance comprising sand, whilst continuously stirring said mixture, and condensing the ketone vapors that evolve.

6. The process of manufacturing ketones which comprises submitting a mixture of calcium salts derived from one or more fatty acids and obtained from the corresponding acid fermentation of sugars, glucosides, polysaccharids, amylaceous substances, amino-acids and like fermentable raw materials in the presence of calcium carbonate and of an inert granular substance to a dry distillation at a temperature gradually increasing up to 300 to 400° C. whilst stirring the said mixture, and condensing the ketone vapors that evolve.

7. The process of manufacturing ketone which comprises submitting a mixture of substantially 100 parts by weight of calcium salts derived from one or more fatty acids and previously obtained from the corresponding acid fermentation (such as butyric fermentation) of sugars, glucosides, polysaccharids, amylaceous substances, amino-acids or like fermentable raw materials in the presence of calcium carbonate, and substantially 30 to 50 parts by weight of a granulous inert substance comprising sand, whilst continuously stirring the said mixture in a closed mixing retort and condensing the ketone vapors that continuously evolve.

In testimony whereof he affixes his signature.

LOUIS LEFRANC.